United States Patent
Björkman et al.

(10) Patent No.: US 9,827,990 B2
(45) Date of Patent: Nov. 28, 2017

(54) METHOD AND DEVICE FOR DETERMINING AN ENERGY CONSUMPTION WHEN DRIVING A VEHICLE

(71) Applicant: SCANIA CV AB, Södertälje (SE)

(72) Inventors: Mathias Björkman, Tullinge (SE); Niklas Pettersson, Stockholm (SE); Johan Falkhäll, Södertälje (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 14/767,009

(22) PCT Filed: Feb. 11, 2014

(86) PCT No.: PCT/SE2014/050169
§ 371 (c)(1),
(2) Date: Aug. 11, 2015

(87) PCT Pub. No.: WO2014/126529
PCT Pub. Date: Aug. 21, 2014

(65) Prior Publication Data
US 2015/0375751 A1     Dec. 31, 2015

(30) Foreign Application Priority Data
Feb. 13, 2013   (SE) ...................................... 1350166

(51) Int. Cl.
*B60W 40/00* (2006.01)
*B60W 50/14* (2012.01)
(Continued)

(52) U.S. Cl.
CPC ............ *B60W 40/00* (2013.01); *B60W 40/09* (2013.01); *B60W 50/14* (2013.01);
(Continued)

(58) Field of Classification Search
None
See application file for complete search history.

(56) References Cited

U.S. PATENT DOCUMENTS

2007/0073468 A1*   3/2007   Tsukamoto ............. B60K 6/48
                                                            701/110
2007/0256481 A1*   11/2007  Nishiyama ............... G01F 9/02
                                                            73/114.52
(Continued)

FOREIGN PATENT DOCUMENTS

DE    102009037875 A1 *  2/2011  ............. B60K 35/00
SE    1150679 A1         1/2013
(Continued)

OTHER PUBLICATIONS

International Search Report dated May 14, 2014 issued in corresponding International patent application No. PCT/SE2014/050169.
(Continued)

*Primary Examiner* — Ryan Rink
(74) *Attorney, Agent, or Firm* — Ostrolenk Faber LLP (57) ABSTRACT

A method for determining a measure of energy utilization during operation of a vehicle (100) which has a first power source (101) for generating a first motive force for propulsion of the vehicle (100) in a first direction of travel, and has at least one first brake system which acts against movement of the vehicle (100) in the first direction of travel. For a first period of time when demand for motive force from the first power source is interrupted, estimating energy consumption during operation of the vehicle (100) without demanding brake force from the first brake system, and using the estimated energy consumption during operation of the vehicle (100), without demanding brake force from the first brake system, as a basis for determining a measure of energy utilization during operation of the vehicle (100).

23 Claims, 5 Drawing Sheets

(51) Int. Cl.
  *B60W 40/09* (2012.01)
  *B60W 30/18* (2012.01)

(52) U.S. Cl.
  CPC .......................... *B60W 30/18109* (2013.01); *B60W 30/18127* (2013.01); *B60W 2050/146* (2013.01); *B60W 2400/00* (2013.01); *B60W 2540/12* (2013.01)

(56) References Cited

U.S. PATENT DOCUMENTS

| | | | | |
|---|---|---|---|---|
| 2011/0043346 | A1* | 2/2011 | Hoffmeister | B60K 35/00 340/438 |
| 2011/0137535 | A1 | 6/2011 | Goto et al. | |
| 2011/0208381 | A1 | 8/2011 | Le Brusq et al. | |
| 2011/0307130 | A1* | 12/2011 | Gow | B60G 17/0195 701/22 |
| 2012/0078468 | A1* | 3/2012 | Popp | B60K 26/021 701/36 |
| 2012/0078496 | A1* | 3/2012 | Lindhuber | B60K 35/00 701/123 |
| 2012/0179346 | A1 | 7/2012 | Aldighieri et al. | |
| 2012/0188068 | A1* | 7/2012 | Hanna | B60W 50/14 340/441 |
| 2013/0268162 | A1* | 10/2013 | Ponziani | B60W 30/00 701/48 |
| 2014/0088858 | A1* | 3/2014 | Stefan | B60K 35/00 701/123 |
| 2014/0172284 | A1* | 6/2014 | Yamasaki | B60W 50/14 701/123 |
| 2014/0180564 | A1* | 6/2014 | Ichinokawa | B60W 50/14 701/123 |

FOREIGN PATENT DOCUMENTS

| | | |
|---|---|---|
| WO | WO 2007/139494 A1 | 12/2007 |
| WO | WO 2011/133094 A1 | 10/2011 |

OTHER PUBLICATIONS

International Preliminary Report on Patentability dated Jun. 3, 2015 issued in corresponding International patent application No. PCT/SE2014/050169.

\* cited by examiner

Fig. 4A — Accelerator pedal depressed

Fig. 4B — Motive force demand interrupted

Fig. 4C — Brake pedal pressed lightly 45kW:

Fig. 4D — Brake pedal pressed lightly 90kW:

Fig. 4E — Brake pedal pressed down hard

METHOD AND DEVICE FOR DETERMINING AN ENERGY CONSUMPTION WHEN DRIVING A VEHICLE

CROSS-REFERENCE TO RELATED APPLICATIONS

The present application is a 35 U.S.C. §§371 national phase conversion of PCT/SE2014/050169, filed Feb. 11, 2014, which claims priority of Swedish Patent Application No. 1350166-3, filed Feb. 13, 2013, the contents of which are incorporated by reference herein. The PCT International Application was published in the English language.

FIELD OF THE INVENTION

The present invention relates to a method for use during operation of a vehicle, particularly a method for determining energy use during operation of a vehicle. It relates also to a system and a vehicle and to a computer programme and a computer programme product which implement the method according to the invention.

BACKGROUND TO THE INVENTION

The background description set out below represents a background description for the invention and therefore need not necessarily represent prior art.

Vehicles in general and at least to some extent heavy vehicles in particular are the focus of ongoing development with a view to fuel efficiency and reduced exhaust emissions. Such factors as growing official concern about pollution and air quality, e.g. in urban areas, have led to the adoption of emission standards and rules in many jurisdictions.

In operating heavy vehicles such as trucks, buses and the like, vehicle economy has over time also had an ever increasing impact on the profitability of the activity in which they are used. Apart from the procurement cost of a vehicle, the main expense items for its routine operation are pay for the driver, repair and maintenance costs and fuel for its propulsion. It is therefore important to try as far as possible to reduce costs in each of these areas.

One area in which development is at least partly stimulated by an endeavour to reduce emissions and fuel costs is that of hybrid vehicles. Hybrid vehicles use two or more sources of power output and/or fuel, and one usual type of such vehicles is the electric hybrid vehicle, in which one or more electrical machines may be used to generate force which acts upon the vehicle's tractive wheels.

The electrical machine affords the advantage of making it possible for electrical energy to be converted to propulsive force with a relatively high degree of efficiency by the electrical machine, which at the same time may also be used to apply braking force to the vehicle's tractive wheels and thereby use the kinetic energy absorbed from them to regenerate electrical energy for feeding back to the vehicle's electrical system and in particular to an energy store. The regenerated energy may subsequently be reused by the electrical machine to generate propulsive force.

Hybrid vehicles thus provide a way of reducing fuel consumption, but it is also very important that they be operated in an economical way by their drivers, since the way a vehicle is operated may have a very large impact on overall fuel economy. This has led to the development of systems intended for example to make it easier for drivers and owners to assess whether vehicles are actually being operated in a fuel economising way.

However, the most advantageous way for a vehicle such as a hybrid vehicle to be operated, e.g. from a fuel economy perspective, is not always obvious to its driver.

SUMMARY OF THE INVENTION

An object of the present invention is to propose a method for determining energy use during operation of vehicles.

The present invention relates to a method for determining a measure of energy utilisation during operation of a vehicle which has a first power source to generate a first motive force for propelling it in a first direction of travel, and at least one first activatable brake system to apply a first brake force which acts against said vehicle's movement in said first direction of travel. For a period of time when demand for motive force from said first power source is interrupted, the method comprises estimating energy consumption during operation of said vehicle without demanding brake force from said first brake system, and using said estimated energy consumption during operation of said vehicle, without demanding brake force from said first brake system, as a basis for determining a measure of energy utilisation during operation of said vehicle.

As mentioned above, it is very important for their overall economy that vehicles be operated in an economical way by drivers, since fuel consumption is greatly affected by their ability to utilise the energy stored on board. It is generally desirable for fuel consumption to be as low as possible, since the larger the amount of energy consumed the more fuel will be required to propel the vehicle by means of the engine.

One way of determining a measure of energy utilisation in order to make an assessment of energy use during operation of a vehicle is to determine the amount of fuel consumed over a certain distance. This does however entail disregarding important factors which may considerably affect the vehicle's fuel consumption, e.g. it may be difficult to identify how much fuel consumption is due to incautious driving and how much is due to other factors which may be difficult for the driver to influence, e.g. level versus hilly terrain, heavily laden vehicle and/or arterial road versus urban environment with dense traffic.

During operation of a vehicle it may also be difficult for the driver to know how well the energy put into storage when the vehicle is in motion actually utilised, i.e. whether he/she is actually operating the vehicle in an economical way.

The present invention affords the advantage of making it possible to assess how a driver operates the vehicle in a way which largely eliminates any effect of cargo or surroundings upon the assessment. This is achieved by determining how the vehicle is operated by the driver when demand for motive force is interrupted.

According to the invention a representation of fuel consumption is estimated when the vehicle is operated without actively applying brake force, i.e. with no brake force from within the vehicle other than that which the power train imparts to the tractive wheels when for example the driver interrupts demand for propulsive force, e.g. by releasing an accelerator pedal. The representation of fuel consumption is thus estimated in situations in which demand for propulsive force to propel the vehicle in the direction of travel is interrupted, i.e. situations where the vehicle's forward movement is due to the energy stored in it, and is affected by forces arising from air resistance, rolling resistance and the power train's braking force in the form of engine friction (not when a combustion engine is disconnected), gearbox friction, and force exerted by ancillary units. The vehicle is thus not acted upon by a brake system force actively applied via a brake system activatable by the driver with a controllably regulatable braking action as is usually the case with (selectively) activatable brake systems.

The term coasting is herein defined as a situation which, when the vehicle is in motion, is represented by the situation which occurs when the driver interrupts demand for motive force, e.g. by releasing an accelerator pedal. In other words, demand for motive force is interrupted and no further brake force is actively applied by the driver.

It will be appreciated that this situation may still involve a certain brake force acting against the vehicle, e.g. when the power train is closed and a gear is engaged, resulting in a certain engine brake effect. It may also happen, e.g. on hybrid vehicles, that the control system disconnects the combustion engine, and the engine brake force due to the engine's losses is replaced by, for example, a corresponding regenerative brake force. Alternatively or in addition, a brake force of a different magnitude may also be applied by the control system if this seems appropriate. This application of brake force does however still take place without the driver actively demanding it.

On the basis of the representation of fuel consumption as above it is then possible to determine a measure of energy utilisation and to make an assessment of how the driver has used available energy during the operation of the vehicle. The greater the amount of energy consumed by allowing the vehicle to coast, i.e. without the driver actively activating any brake system, the more efficiently will he/she operate the vehicle, since the stored energy will be fully utilised. Conversely, the more the brake force is actively demanded via any brake system, the less energy-efficiently will the vehicle be operated.

In one embodiment the energy consumption when coasting is compared with energy consumption via active demand for brake force from one or more brake systems which are independent of said combustion engine, which means that they can be controllably applied irrespective of how the engine is controlled, e.g. independently of whether it is disconnected from the rest of the power train or not, such as a service brake system or a supplementary brake system, in which case the comparison of energy consumption between the different ways of operating the vehicle may be used in determining a measure of energy utilisation for assessing the driver's way of operating the vehicle.

In one embodiment the vehicle takes the form of a hybrid vehicle with means for its regenerative braking. In this case, part of the energy braked away may be recovered and may be taken into account in the measure of energy utilisation, in that brake force demanded via regenerative braking is more economical than employing for example a service brake system or a conventional, e.g. hydraulic, retarder brake system without brake force recovery, since part of brake energy regenerated may be stored in the form of electrical energy in an energy store for reuse. However, regenerative braking is still to a great extent always less energy-efficient than coasting without any active application of brake force, owing to the losses of the regenerative brake system. The vehicle may also be provided with both regenerative and non-regenerative brake systems, in which case the measure of energy utilisation in the assessment of the driver decreases in step with an increasingly large proportion of the energy being braked away via a non-regenerative brake system.

The measure of energy utilisation determined during the vehicle's operation may be presented for the driver, e.g. via a display, in the form for example of an indication of a proportion, e.g. a percentage, of the assessment which is deemed to represent the most economical form of operation of the vehicle, which is normally achieved by simply rolling forwards without active application of brake force. Preferably the driver can receive information continually, or when desired, about assessments arrived at.

The measure of energy utilisation may also be arranged to be transmitted to a remote location, e.g. a haulage centre for a vehicle fleet, making it possible for two or more vehicles/drivers to be evaluated centrally. The presentation of the assessment may also be combined with giving the driver energy consumption hints for improvement. One example of such a hint might be to interrupt demand for motive force earlier in order to be able to operate the vehicle by coasting without applying a brake system to any great extent. Another example might be to recommend gentler braking.

The method may comprise determining said measure of energy utilisation for one interruption of motive force at a time, enabling the driver to have an assessment for a specific interruption and hence to obtain and be presented with a new assessment for each interruption. The measure of energy utilisation may also be determined continuously during an ongoing interruption of motive force, in which case the measure/assessment may change instantaneously depending on how the driver acts during the interruption, e.g. if he/she applies a brake system after a certain time.

The measure of energy utilisation may also take the form of a cumulative measure covering a number of successive motive force interruptions, e.g. an accumulated measure of energy utilisation from when the vehicle is put into operation by the driver for the first time, or a measure of energy utilisation during the current journey or some other suitable period of time, e.g. the current month.

Estimation of fuel consumption when demand for motive force is interrupted begins preferably as soon as it is interrupted, provided that the vehicle is in motion, with a view to continuing for the period when the demand is interrupted, and to accumulation with previous estimates where appropriate as above.

Further characteristics of the present invention and advantages thereof are indicated by the detailed description set out below of embodiment examples and the attached drawings.

DETAILED DESCRIPTION OF PREFERRED EMBODIMENTS

In the present description motive force demand means demand for positive propulsive force in the vehicle's direction of travel. Interruption of motive force demand therefore means that demand for positive propulsive force in the vehicle's direction of travel ceases.

The present invention will now be exemplified in relation to a hybrid vehicle, but is also equally applicable on other vehicles, e.g. electric vehicles, and on conventional vehicles powered by combustion engines alone.

Figure 1A:
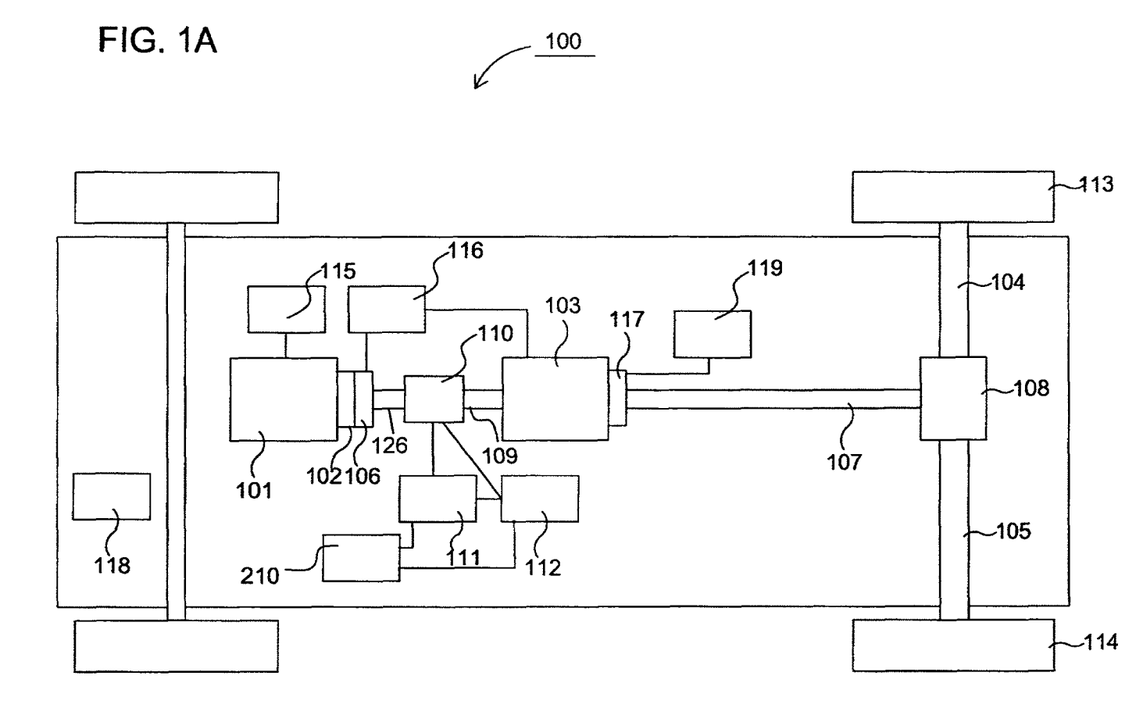
FIG. 1a depicts a power train in a vehicle on which the present invention may with advantage be employed.

FIG. 1A schematically depicts a general layout of a power train in a hybrid vehicle 100 according to an embodiment of the present invention. There are various types of hybrid vehicles and the vehicle here depicted takes the form of a parallel hybrid vehicle.

The vehicle 100 schematically depicted in FIG. 1A has only one axle with tractive wheels 113, 114, although the invention is also applicable on vehicles which have more than one axle provided with tractive wheels, and on vehicles with one or more further axles, e.g. one or more tag axles.

The power train of the parallel hybrid vehicle in FIG. 1A comprises a combustion engine 101 which in a conventional way is connected, via an output shaft of the engine 101, usually via a flywheel 102, to a gearbox 103 via a clutch 106. The engine 101 is controlled by the vehicle's control system via a control unit 115. Also controlled are the gearbox 103 and the clutch 106, which in the present example is operated automatically by the vehicle's control system but might alternatively be operated manually by the vehicle's control system by means of a control unit 116.

Gearboxes in heavy vehicles often take the form, as in the embodiment depicted, of a "manual" gearbox 103 which is operated automatically (by means of the vehicle's control system) whereby the clutch 106 selectively connects the output shaft 126 of the engine 101 to the gearbox 103.

The vehicle further comprises driveshafts 104, 105 which are connected to its tractive wheels 113, 114 and which, as in a conventional combustion engine system, are driven by an output shaft 107 of the gearbox via a final gear, e.g. a conventional differential 108.

Unlike a conventional vehicle, that depicted in FIG. 1A comprises also an electrical machine 110 which is connected to the input shaft 109 of the gearbox 103, downstream of the clutch 106, which means that the gearbox input shaft 109 can be driven by the electrical machine 110 even when the clutch 106 is open. The parallel hybrid vehicle can thus provide force to the tractive wheels 113, 114 from two separate power sources simultaneously, i.e. both from the combustion engine 101 and from the electrical machine 110. Alternatively, the vehicle may be propelled by only one power source at a time, i.e. either by the combustion engine 101 or by the electrical machine 110. The present invention is still equally applicable on other types of hybrid vehicles. The vehicle may also be provided with two or more electrical machines, in which case an electrical machine may be fitted adjacent to each tractive wheel. The vehicle may for example be of a type with a conventional automatic gearbox which the electrical machine may be upstream or downstream of.

The hybrid system also comprises further components. FIG. 1A depicts only the electrical machine 110, an energy store 111 and a hybrid control unit 112 which takes care inter alia of the functions of the electrical machine 110 and of the energy store 111. The electrical machine is provided with power supply at a variable frequency, enabling it to rotate a shaft at any desired rotation speed and any desired torque within the speed/torque range of the electrical machine. In the example depicted, the electrical machine 110 is powered from the energy store 111 via a power electronics unit 210 which generates said supply frequency. The energy store 111 may be arranged to be charged by regenerative braking by means of the electrical machine 110 and the power electronics unit 210, but also in other ways such as by connection to an external power source, e.g. a conventional electrical network.

The electrical machine 110 may thus be used to propel the vehicle 100 at in principle any desired speed by means of frequency control, and to apply in principle any desired brake force up to that corresponding to the maximum torque which the electrical machine can impart.

According to the present invention a measure of energy utilisation is determined in order to assess the driver's way of operating the vehicle in certain types of situations, viz. those in which motive force demand is interrupted and the vehicle's energy stored up over a number of such interruptions is normally consumed at least partly by active braking by means of a brake system, or simply by the other forces acting against the vehicle's forward movement, as when it is coasting by means of the kinetic energy stored up in it, without any brake force internal to the vehicle other than the power train's losses, possibly by brake force applied as above by the vehicle's control system without active demand from the driver, and by external forces acting upon the vehicle's tractive wheels, i.e. without brake force via any of its brake systems being actively demanded.

With regard to active demand for brake force from vehicle brake systems, the vehicle 100 further comprises various brake systems such as a conventional service brake system and a retarder brake system 117. Retarder brake systems such as the retarder brake system 117 may for example be situated on the output shaft of the gearbox 103, i.e. at the rear edge of the gearbox, in which case brake action may for example be provided by electrical, hydraulic or magnetic braking of the gearbox output shaft and hence also of the vehicle's tractive wheels 113, 114. The vehicle may also have other supplementary brake systems such as one or more from among exhaust brake system, controllably regulatable engine brake system, compression brake system, electromagnetic brake system etc.

In the example depicted of the vehicle's control system, the service brake system, like the retarder brake system 117, is operated by means of a brake control unit 119 which for example sends signals in a conventional way to for example the regulator or regulators which regulate brake force in brake systems demanded. In the example depicted, the brake control unit 119 also controls at least partly regenerative braking by the electrical machine. On the basis of commands initiated by the vehicle's driver or other control units, the control unit 119 sends control signals to suitable system modules to demand desired brake force. For example, the driver may for example demand retarder brake force or service brake force, but where the control system finds that the desired brake force can be provided by more economical regenerative braking, the latter will in practice be employed.

As above, the functions of the vehicle components depicted are controlled by a number of control units. Control systems in modern vehicles generally comprise usually a communication bus system consisting of one or more communication buses for connecting a number of electronic control units (ECUs), or controllers, to various components on board the vehicle. Such a control system may comprise a large number of control units, and taking care of a specific function may be divided between two or more of them.

For the sake of simplicity, FIG. 1A depicts only control units 112, 115, 116, 118 and 119 but vehicles 100 of the type depicted will often be provided with significantly more control units, as one skilled in the art will appreciate.

In addition to the control units referred to above, FIG. 1A also depicts a control unit 118 which controls the presentation of data on the instruments provided in the driving cab, which often comprise not only conventional indicating instruments but also one or more displays. The control unit 118 makes it possible for a measure representing the driver's energy utilisation to be presented on these one or more displays, or on a display intended specifically for the purpose, for viewing by the driver.

The invention may be implemented in any suitable control unit, and in the example depicted it is implemented in control unit 118. The calculations performed by control unit 118 (or the one or more control units in which the present invention is implemented) in estimating the driver's ability to utilise the energy stored in the vehicle according to the present invention will probably depend on signals received from the one or more control units which operate engine/motor functions, in the present example control unit 115, and probably also on signals from control units 112, 119 and other undepicted control units with which the vehicle is provided, and/or on information from for example various sensors on board the vehicle. It is generally the case that control units of the type here concerned are normally adapted to receiving sensor signals from various parts of the vehicle.

Control units of the type here concerned are also usually adapted to delivering control signals to various parts and components of the vehicle. Control unit 118 may for example deliver signals to said displays for presentation of data.

Control is often governed by programmed instructions, typically in the form of a computer programme program which, when executed in a computer or control unit, causes the computer/control unit to effect desired forms of control action, e.g. method steps according to the present invention. The computer program usually forms part of a computer program product comprising a suitable storage medium 121 (see FIG. 1B) which has the computer program stored on it. Said storage medium 121 may for example take the form of any from among ROM (read-only memory), PROM (programmable read-only memory), EPROM (erasable PROM), flash memory, EEPROM (electrically erasable PROM), a hard disc unit etc., and be situated in, or in communication with, the control unit, in which case the computer program is executed by the control unit. The vehicle's behaviour in a specific situation may thus be varied by altering the computer program's instructions.

Figure 1B:
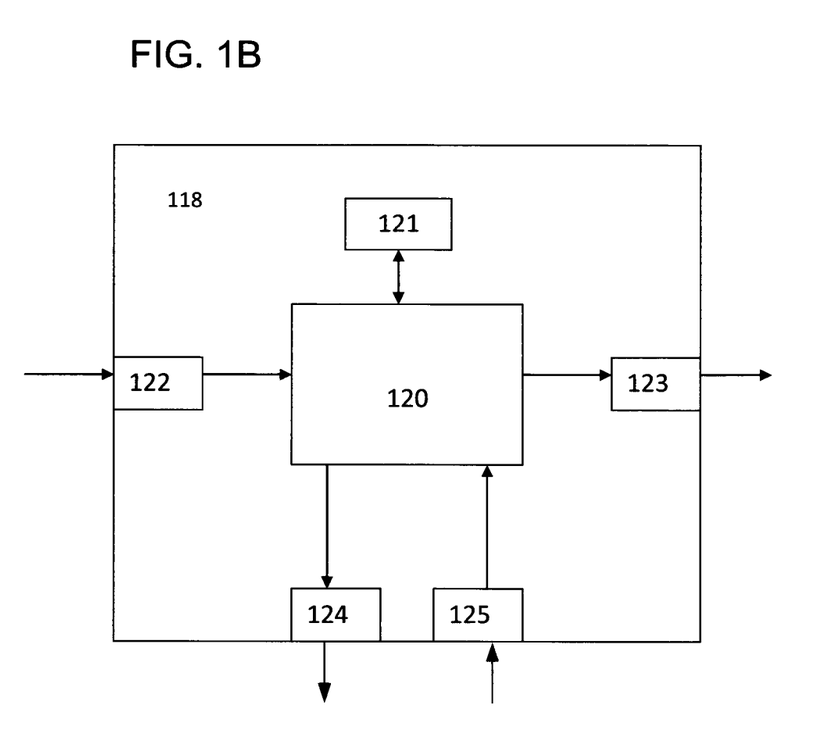
FIG. 1b depicts an example of a control unit in a vehicle control system.

An example of a control unit (control unit 118) depicted schematically in FIG. 1B may itself comprise a calculation unit 120 in the form for example of any suitable kind of processor or microcomputer, e.g. a circuit for digital signal processing (Digital Signal Processor, DSP), or a circuit with a predetermined specific function (Application Specific Integrated Circuit, ASIC). The calculation unit 120 is connected to a memory unit 121 which provides it with, for example, the stored program code and/or the stored data which the calculation unit needs to enable it to perform calculations. The calculation unit 120 is also arranged to store partial or final results of calculations in the memory unit 121.

Control unit 118 is further provided with respective devices 122, 123, 124, 125 for receiving and sending input and output signals. These signals may comprise waveforms, pulses or other attributes which the input signal receiving devices 122, 125 can detect as information for processing by the calculation unit 120. The output signal sending devices 123, 124 are arranged to convert calculation results from the calculation unit 120 to output signals for conveying to other parts of the vehicle's control system and/or the component or components for which the signals are intended. Each of the connections to the respective devices for receiving and sending input and output signals may take the form of one or more from among a cable, a data bus, e.g. a CAN (Controller Area Network) bus, a MOST (Media Oriented Systems Transport) bus or some other bus configuration, or a wireless connection.

Figure 2:
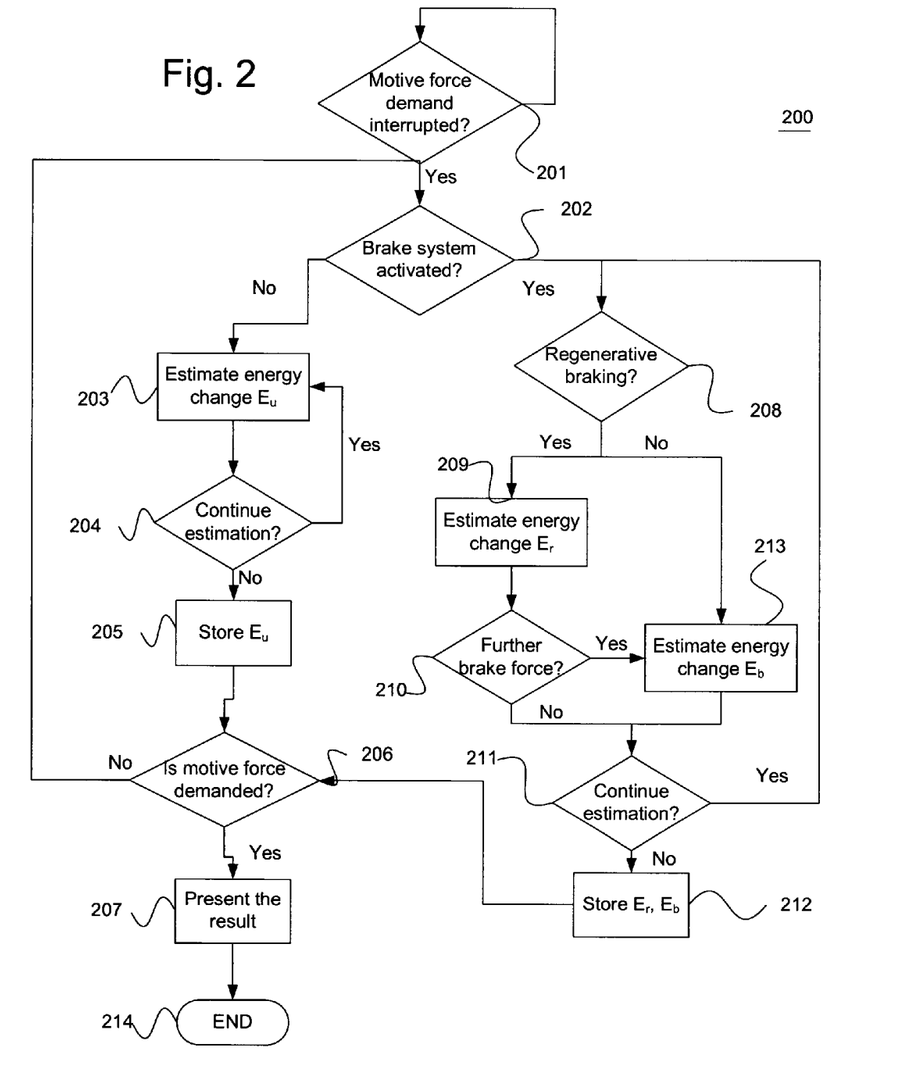
FIG. 2 depicts an example of a method according to the present invention.

FIG. 2 depicts an example of a method 200 according to the present invention. The method begins at step 201 by determining whether demand for motive force is interrupted by the vehicle's driver. This may for example be indicated by the driver raising his/her foot from an accelerator pedal or indicating in some other way to the vehicle's control system that motive force for the vehicle's propulsion, which may be imparted to its tractive wheels by the combustion engine 101 and/or electrical machine 110, is no longer desired.

The present invention's object is to determine the way in which the vehicle is operated by the driver from an energy consumption perspective, i.e. how its stored energy is in practice utilised by him/her during the period when motive force demand is interrupted, by determining a measure of energy utilisation during operation of the vehicle.

When it is thus found at step 201 that the driver interrupts motive force demand, the method moves on to step 202 to determine whether brake force from any of the vehicle's brake systems is actively demanded, i.e. whether brake force has been actively demanded by the driver activating any brake system. As mentioned above, regenerative braking is also regarded as among the vehicle's brake systems. However, regenerative brake force is not normally chosen explicitly by the driver, who will actually demand activation of some suitable brake system, whereupon the vehicle's control system does where possible employ regenerative braking action instead of braking action demanded. As above, the braking effect of combustion engine losses and other power train losses is passive and applies when motive force demand is interrupted even without the driver actively demanding brake force, so this braking effect does not represent active demand for brake force from a brake system.

If brake force is actively demanded by the vehicle's driver, the method moves to step 208 as below, whereas if brake force is not demanded it moves on to step 203 to estimate how the vehicle's stored energy is consumed when it is coasting, i.e. with no demand for motive force and with no brake system applied. This energy consumption $E_u$ may be a function of time and can for example be estimated as below.

When the vehicle is in motion but no brake systems internal to it are activated, energy stored in it is consumed primarily by brake forces caused by air resistance, rolling resistance and power train losses, particularly combustion engine friction. If the vehicle is travelling on an entirely level road, the decrease in stored energy may be estimated as $$\frac{mv_1^2}{2} - \frac{mv_2^2}{2},$$

i.e. the difference in kinetic energy, where $v_1$ is the vehicle's speed when motive force demand is interrupted and $v_2$ its speed when motive force is again demanded. In one embodiment this formula may be employed in estimating the amount of stored energy consumed when motive force demand is interrupted and no brake force is actively demanded. However, this approach takes no account of vehicle speed changes caused by, for example, sloping running surfaces. In one embodiment an estimation is therefore made in which more/other factors are incorporated in the calculation. The following factors may for example be used in estimation of energy consumption when motive force demand is interrupted.

One cause of energy consumption during operation of vehicles is air resistance, which may be determined as the air resistance force $F=\frac{1}{2}\rho ACdv^2$, in which $\rho$=density of air, A=cross-sectional area of vehicle in direction of travel, v=vehicle speed relative to wind. The air resistance thus depends greatly (quadratically) on the vehicle's speed. Cd is the air resistance coefficient, which depends on the configuration of the vehicle's surfaces which face the wind and is in principle affected by all of its external parts. The air resistance coefficient may be difficult to calculate but the air resistance force may for example be estimated by the vehicle's control system by subtracting the other counteracting forces as below from the force developed by the engine/motor, which is for example available via the engine control unit. The air resistance coefficient may thus also be estimated. Alternatively, Cd may be measured but will change when for example another trailer is attached. The air resistance may thus be calculated by the vehicle's control system.

The vehicle's rolling resistance may be expressed as F=CrN, in which Cr is the rolling resistance coefficient, which depends mainly on the vehicle's tyres/wheels, the road surface and the normal force N, i.e. the vehicle's prevailing weight is of great significance. The rolling resistance force may also be determined by the vehicle's control system.

Another factor is the power train losses, which are of several kinds. The combustion engine's internal friction effect may be calculated as $P=M\omega$, in which M is the drag torque specific to the engine, $\omega$ is the angular velocity ($2\pi$*the engine's rotation speed) and the energy consumed may thus be arrived at by integrating this effect over time. It will be appreciated that the friction effect depends on rotation speed and increases with increasing rotation speed. If the vehicle is operated with the combustion engine disconnected from the tractive wheels, this term may be deleted.

A good estimate of the energy consumed during coasting may normally be arrived at on the basis of the factors so far mentioned. If a still more accurate estimate is desired, the calculation may include further factors such as gearbox friction, which likewise depends on rotation speed. Losses due to the efficiency of the gearbox also apply, as do friction losses in axles/hubs, which again depend on rotation speed. Efficiency is also involved here. The power train's composite losses, or individual losses of its various components, may be stored for different rotation speeds in the control system and be usable in making estimates according to the invention.

Thus at step 203 the energy consumption which occurs when the vehicle is coasting may be estimated by summation of energy consumption via said parameters. The method may then be adapted to remaining at step 203 via a step 204 so long as the condition is fulfilled, i.e. so long as neither motive force nor brake force are demanded by the vehicle's driver.

Where at step 204 it is found that the condition for estimation according to step 203 is no longer fulfilled, either because motive force demand has resumed or because brake force is actively demanded, the method moves on to step 205 for storage of estimated energy consumption $E_u$. The energy consumption estimated at step 203 may be stored in the form of a cumulative value over the period of time during which the vehicle has specifically been operated with no demand for motive force or brake force, and/or be accumulated together with estimated energy consumptions over previous periods when the conditions for step 203 were fulfilled. The method thus estimates how much of the vehicle's stored energy is converted to other forms of energy when it rolls along a road without being affected other than by external factors and internal losses.

The method then moves on to step 206 for determination of whether the condition for step 203 is no longer fulfilled because motive force is still demanded. If such is the case, the method moves on to step 207 as below. If at step 206 it is found that motive force is still not demanded but that the condition for step 203 is not fulfilled through some other cause, e.g. because a brake system internal to the vehicle has been activated, the method goes back to step 202 before moving on to step 208.

Step 208 determines whether a regenerative brake system has been activated, i.e. whether the vehicle 100 is being braked by the electrical machine 110. Regenerative braking is not normally demanded explicitly by the driver but is activated by the vehicle's control system instead of, for example, activating the brake system demanded by the driver, e.g. wheel brakes or retarder brakes.

If the vehicle is braked regeneratively, the method moves on from step 208 to step 209 for estimation of energy consumed via regenerative braking. This estimation may be arranged to comprise determining the amount of energy converted by use of regenerative braking, which may be estimated in a suitable way, e.g. by determining the braking force applied by the electrical machine 110. This force may usually be determined with good accuracy. Step 209 may also be arranged to estimate the amount of energy actually put into the energy store during the regenerative braking, if it differs from the brake force applied by the electrical machine. It is for example possible for a larger force to be applied where only part of the energy regenerated is put into the energy store, while part is converted to heat or made use of in some other way.

Normally, however, the electrical machine applies brake force which substantially results in electrical energy which can be received by the energy store. One skilled in the art will appreciate that there are also losses in the regenerative brake system, which means that the brake force applied will be greater than the energy actually supplied to the energy store.

In one embodiment the amount of energy actually recovered by being put into the energy store is estimated, and losses during regenerative braking take the form of brake energy absorbed minus energy put into storage. As below, however, there may for driver assessment purposes be advantages in not conducting such specific determination of the amount of energy actually put into storage, but instead in estimating energy consumption during regenerative braking as energy storable when the regenerative braking works at full capacity. One embodiment therefore estimates the amount of energy which might theoretically have been recovered at full capacity, irrespective of the amount actually recovered during the braking.

It will be appreciated that the brake force applied by the regenerative brake system may also be less than the total brake force demanded, in which case further non-regenerative brake force may be applied, e.g. by using the vehicle's service brake system or a supplementary brake system. Step 210 therefore determines whether the regenerative braking accounts for the whole brake force applied. So long as such is the case, the method goes on to step 211 to determine whether there should be continued estimation of force braked away, i.e. whether motive force demand is still interrupted and brake force is demanded. If such is the case, the method goes back to step 208 for continued estimation. If at step 211 it is found that continued estimation of force braked away should not take place, the method moves on to step 212 for data storage, as in step 205 above, before moving on to step 206 to determine whether motive force is or is not demanded.

If at step 210 it is found that not only regenerative braking action but also further braking action is applied, step 213 estimates energy consumption via this further brake force. The method also moves directly to step 213 from step 208 if there is no regenerative braking. The energy consumption for further brake forces may for example be estimated as the difference between the total brake force applied and the brake force applied via the regenerative brake system. Alternatively the brake force may be estimated specifically for the specific brake system used.

The brake force generated by the retarder depends on its location, e.g. after the gearbox as in FIG. 1A. The retarder brake effect may for example be determined by multiplying the torque which is generated by the retarder and acts upon the gearbox output shaft by the angular velocity of the output shaft, in which case energy consumed may be arrived at by integrating this effect over time as above. The retarder's brake torque at the time is normally available via the vehicle's control system.

In the case of disc brake systems and drum brake systems there is often availability of brake pressures (from which brake torques may be calculated on the basis of physical relationships known to one skilled in the art) or direct availability of the brake torque via the control system. This makes it easy to provide the control unit 118 with desired information. It is well known that energy E may then be expressed as E=Fs, in which F represents force and s distance, which is the same as time integration of speed and velocity, i.e. the effect P=F (force acting upon vehicle)*v (vehicle speed).

There are various different ways of determining brake forces for disc and drum brakes. The torque of these brakes may for example be multiplied by the angular velocity of the wheels, in which case this effect may be integrated over time as above to arrive at the brake energy. If there is no information about this brake torque, a model may be used to go from brake pressure to braking torque. All such information is usually known from vehicle specifications and/or is available via the control system. The brake force for disc and drum brakes may for example also be determined as $$F = \frac{\omega M}{v},$$

in which M is the brake torque, v the vehicle's speed and ω the angular velocity, making it possible to calculate effect/energy as above. Energy braked away may thus be estimated in a suitable way.

It should also be noted that the calculations exemplified above are merely examples of how energy braked away may be determined. Control systems in vehicles are undergoing continual development and becoming constantly better equipped to calculate the energy braked away via vehicle brake systems, and it is within the scope of the present invention to perform the calculations in the way most appropriate to the respective vehicle.

Brake forces applied are thus estimated and accumulated as above until brake force is no longer demanded or motive force is again demanded, whereupon the method moves on to step 207 to present the result for the vehicle's driver.

At step 207 the result is thus presented for the driver. There are various different ways in which this may take place. It is for example possible for data to be presented on a display with a measure of energy utilisation which represents both an assessment of the latest period when motive force demand was interrupted and a total assessment of the vehicle's whole journey. These data may for example be only presented on a screen during the time when motive force demand is interrupted or alternatively, for example, be presented continuously. Said data may for example also be arranged to be accessible via screen images scanned by the vehicle's driver. Data as above may alternatively, or in addition, be presented for the driver in some other suitable way. They may for example be presented visually in some other suitable way or, for example, via suitable acoustic/voice signals or by suitable tactile signals. The method then ends at step 214.

Figure 3:
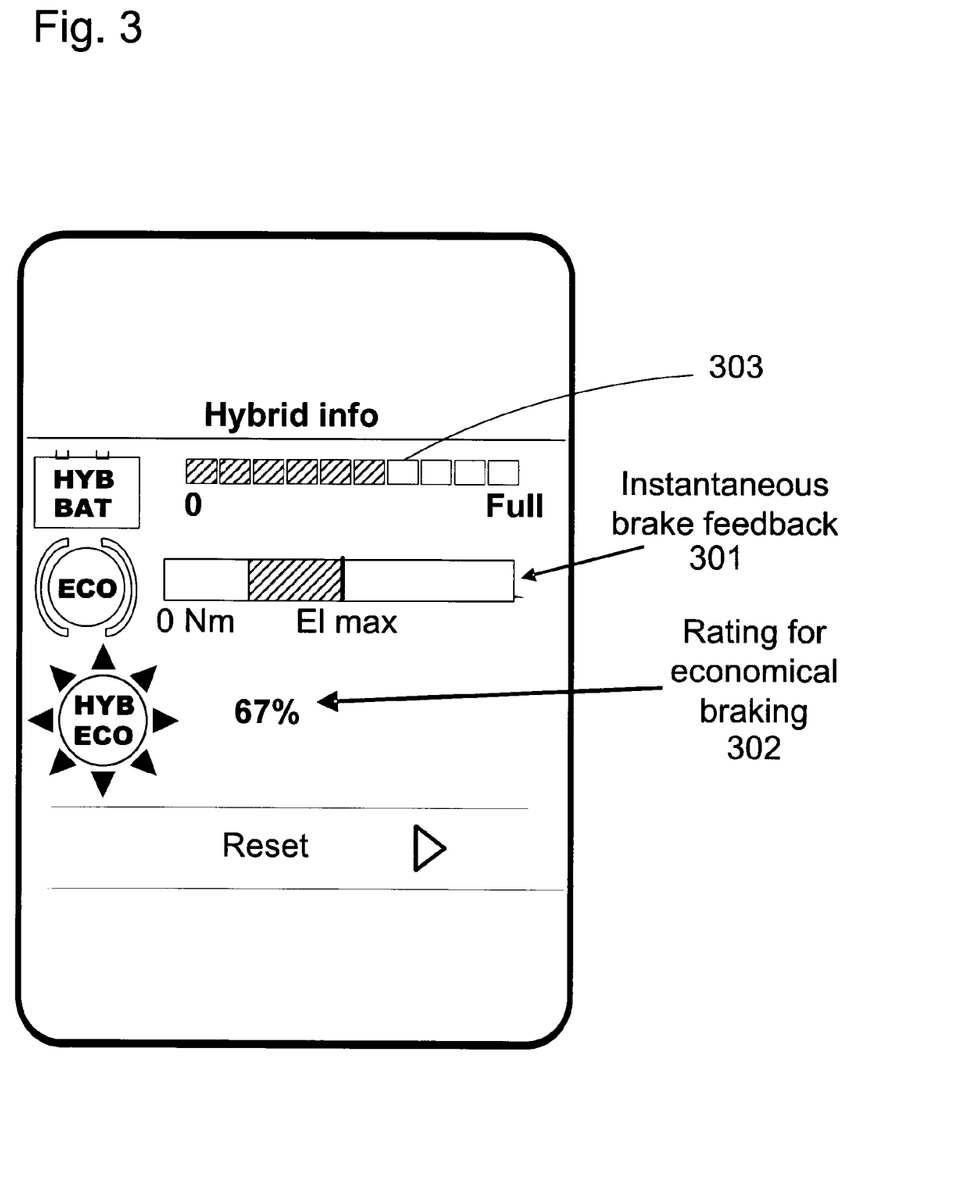
FIG. 3 depicts an example of presentation of a measure of energy utilisation for the driver of a vehicle.

FIG. 3 depicts an example of what presentation for the vehicle's driver might be like. Ref. 301 denotes instantaneous feedback of the driver's behaviour, as depicted in more detail in FIGS. 4A-4E. This feedback shows how well he/she uses the vehicle's stored energy in a situation where motive force demand is interrupted, in the form of a bar chart which can assume a value to the right or left of a reference line 401 (see FIG. 4A). FIGS. 4A-E represent different situations and the bar represents different degrees of economical operation such that a completely full bar (indicated by hatching, see FIG. 4B) to the left of the reference line 401 represents maximum utilisation of the vehicle's stored energy, whereas a bar which assumes a value to the right of the reference line (likewise indicated by hatching, see FIG. 4E) represents desired behaviour during operation of the vehicle. The reference line 401 denotes maximum recovery by regenerative braking.

Figure 4A:
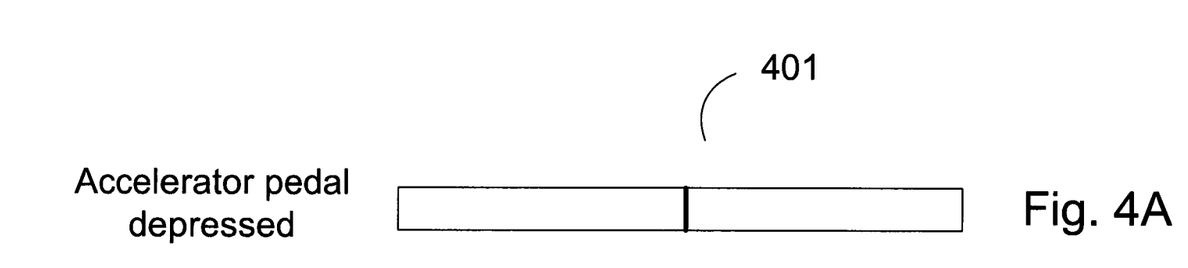
FIGS. 4A-E depict another example of presentation of a measure of energy utilisation for the driver of a vehicle.
Figure 4B:
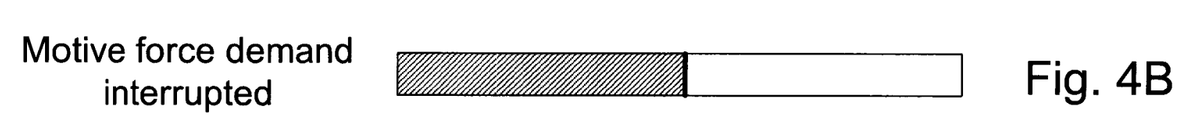

When the vehicle runs with active demand for motive force, e.g. via an accelerator pedal, the bar will be inactive, FIG. 4A. When motive force demand is subsequently interrupted, the bar will assume different positions depending on how the driver acts. FIG. 4B illustrates a situation where he/she demands neither motive force nor brake force, i.e. the vehicle is coasting. This represents, as above, the most economical way of operating the vehicle, since no energy is braked away unnecessarily. This is why a completely full bar to the left of the reference line is also depicted.

As soon as the driver applies brake force, however, even if regenerative brake force is applied, energy loss will occur because the energy conversion in the regenerative brake system is not free from losses.

Figure 4C:
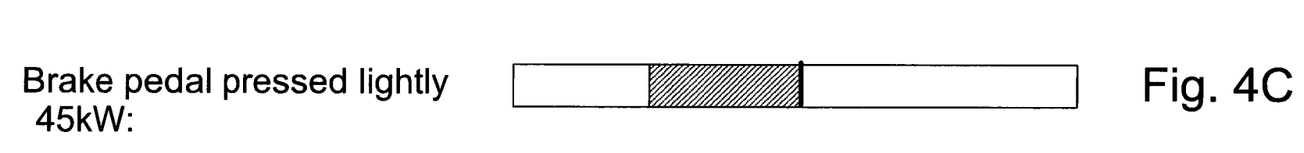
Figure 4D:
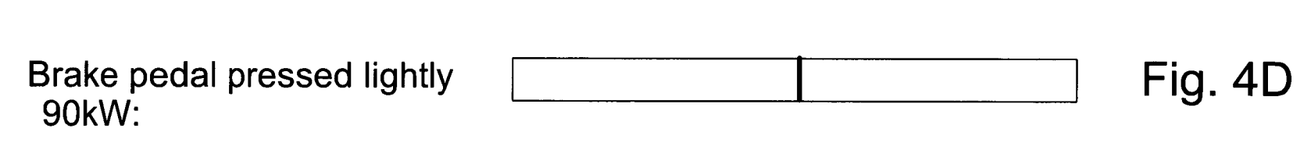
Figure 4E:
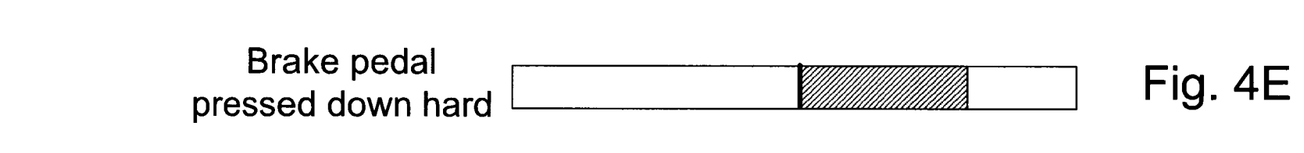

FIG. 4C and FIG. 4D represent respective situations with different degrees of moderate brake force application, whereby less application of brake force makes it possible to recover a larger proportion of the brake energy, so the bar in FIG. 4C indicates better energy utilisation than the harder application of brake force in FIG. 4D, which represents the maximum brake force which can be applied by regenerative braking. FIG. 4E represents hard braking whereby a very large proportion of the energy braked away is lost because the brake force far exceeds the force which can be recovered by regenerative braking (the reference line 401 thus indicates the limit for maximum regenerative brake force recovery). In this case the bar therefore runs in the opposite direction, indicating very uneconomical/undesirable use of the vehicle's stored energy.

The bar may thus change instantaneously when the driver changes demand for brake force. As well as the instantaneous feedback of utilisation of the vehicle's energy, FIG. 3 depicts a composite estimated measure 302 for the specific period of time with interrupted motive force demand, i.e. during an ongoing motive force interruption, or a cumulative measure for the vehicle's journey or some other suitable period of time. Various measures relating to different periods of time may also be presented. The screen image exemplified in FIG. 3 also shows the energy store's state of charge 303. As may be seen, the bar chart exemplified in FIGS. 3-4 may assume many different shapes, e.g. vertical, mirror image, indicator shape etc. etc., so long as the distinction between the situation where brake force is actively demanded and the situation where it is not demanded is clear.

The values illustrated in FIGS. 3-4 may for example be calculated by the following non-limitative algorithm as, for example, a percentage measure:

$$r_{eco} = \frac{X_{eco}(n_0) - X_{eco}(n_{reset})}{X_{tot}(n_0) - X_{tot}(n_{reset})} \times 100(\%) \qquad (1)$$

in which $r_{eco}$ is the measure of how well the driver utilises the vehicle's stored energy, expressed as a percentage.

$X_{eco}$ is a composite value for the energy utilised, i.e. the proportion of $X_{tot}$ which does not result in braking losses during motive force interruptions.

$X_{tot}$ is a composite value representing the total amount of energy consumed during motive force interruptions.

$n_0$ is an index for the latest cumulative value determined.

$n_{reset}$ is an index for prevailing value at latest reset.

The algorithm in the hybrid system for calculating $X_{eco}$ and $X_{tot}$ may be written as $$X_{eco} = \int \eta_{eco} \min(-mv(\dot{v}+g\sin(\alpha)), P_{sat})\theta dt$$

$$X_{tot} = \int -mv(\dot{v}+g\sin(\alpha))\theta dt \qquad (2)$$

in which $\eta_{eco}$ is a factor which describes the combined efficiency when operating with no demand for motive force and depends on whether regenerative and/or non-regenerative braking are demanded;

m is the vehicle's estimated weight;

v is the vehicle's speed;

$\dot{v}$ is the vehicle's acceleration;

g is the gravitational constant (9.82 m/s$^2$);

α is road gradient;

$P_{sat}$ is a saturation level for the aggregate of running resistance and regenerative braking, i.e. the total brake force which may be arrived at on the basis of these two factors. One embodiment uses the theoretically maximum possible energy recovery via regenerative braking in this determination as below.

θ is a factor equal to one when the motive force demanded by the driver is less than or equal to zero. When the motive force demand is positive this factor is zero.

$\eta_{eco}$ and $P_{sat}$ may for example be calculated by the algorithm $$\eta_{eco} = \frac{P_s + \eta_g P_g}{P_s + P_g} \qquad (3)$$

$$P_{sat} = P_s + P_g^{sat}$$

in which $\eta_g$ is the total efficiency for regenerative braking;

$P_s$ is the estimated running resistance, defined as air resistance+rolling resistance+internal losses in the vehicle's power train;

$P_g$ is current brake level $P_{brake}$ up to $P_g^{sat}$ and may be expressed as min($P_{brake}$, $P_g^{sat}$);

$P_g^{sat}$ is the saturation effect level during regenerative braking.

Where motive force demand is interrupted at a time when no brake systems are activated, $\eta_{eco}$ will be 1 ($P_g$=0). This is the best way of using the vehicle's stored kinetic energy. The energy lost by storing energy in the hybrid system's energy store is described by the factor $\eta_g$. If the hybrid system had no losses, i.e. if $\eta_g$=1, the efficiency would be the same during braking by means of the hybrid system as operating the vehicle without applying any brake force when motive force demand is interrupted. The proportion of $X_{tot}$ not covered by the above represents pure loss of energy.

A straightforward way of arriving at a good measure of the driver's way of driving is thus possible in that the example depicted results in an average assessment since latest reset. Preferably, the driver may reset the assessment in order for example to be able to have immediate feedback about how the vehicle responds to changes in the way it is operated. Its control system may nevertheless still store the measure for the whole journey and, for example, still earlier data. Thus reference points for calculations may be determined at resets, e.g. $X_{eco}(n_{reset})$ and $X_m(n_{reset})$ as above. A measure may also be provided immediately after each situation, beginning when the driver interrupts demand for motive force and proceeding until he/she again demands motive force, i.e. a measure for each period when e is equal to one as above.

Calculated parameters may for example be sent to a transport management system for managing the vehicle fleet which the vehicle is part of, e.g. Scania's "Scania Fleet Management", enabling the vehicle's owner to monitor assessments of different drivers.

As mentioned above, one embodiment determines not the actual energy recovered by regenerative braking but that which would be recovered if the regenerative brake system worked optimally. For example, various circumstances may cause the efficiency of the regenerative braking to become low, e.g. because the energy store is full or prevailing ambient temperatures are such that it cannot receive as much energy as during optimum conditions, or the regenerative braking does for some other reason not work optimally.

Should the assessment of the vehicle's driver when operating the vehicle in such conditions be negative despite his/her having basically operated the vehicle in an economical way, simply because the hybrid system does not work optimally, this might cause him/her to still be reluctant to drive in a basically desirable way, resulting in inferior economy. In such situations it may therefore be advantageous to determine an assessment of the vehicle's operation which assumes that the theoretically maximum brake force recovery in the prevailing conditions has also occurred, in which case the driver's rating will be based on driving with an optimally working system and not on any deficiencies or other limiting factors.

The method illustrated in FIG. 2 may also be arranged to be only applied so long as the vehicle's cruise control functions are inactivated, since if a cruise control function is activated the vehicle's control system will largely take care of how the vehicle operates. Irrespective of whether a cruise control function is activated or not, however, the present invention is applicable as soon as the driver actively interrupts motive force demand.

The invention is described above in relation to a parallel hybrid system, but is also applicable on vehicles with other types of hybrid systems, as also on for example electric vehicles which have one or more electrical machines only. The invention is also applicable on conventional vehicles with combustion engine operation only, in which case the section relating to regenerative braking and energy storage as above will not apply.

The invention claimed is:

1. A method for determining a measure of energy utilisation during operation of a vehicle, wherein said vehicle includes a first power source for generating a first motive force for propulsion of said vehicle in a first direction of travel, and at least one first brake system configured to be activated to apply a first brake force which acts against movement of said vehicle in said first direction of travel;
    the method comprising performing the following steps, during a first period of time during said operation of said vehicle;
    interrupting, by a driver of said vehicle, a demand for said first motive force from said first power source, and during said interruption, performing the following steps:
        estimating energy consumption during said operation of said vehicle without demanding brake force from said at least one first brake system,
        determining said measure of energy utilisation during said operation of said vehicle based on said estimated energy consumption during said operation of said vehicle, without demanding said brake force from said at least one first brake system,
        comparing, for said first period of time, said estimated energy consumption during said operation of said vehicle without demanding brake force from said at least one first brake system, said comparing being with energy consumption via active employment of one or more of said at least one first brake system, and using said comparison as a basis for determining said measure of energy utilisation during said operation of said vehicle, and
        displaying to said driver of said vehicle said measure of energy utilisation during said operation of said vehicle by displaying said measure of energy utilisation as a bar with a reference line indicating maximum recovery of stored energy of the vehicle by regenerative braking for a corresponding value of brake force applied for the maximum recovery, a bar to the left or the right of the reference line indicating the amount of recovery or loss of the stored energy of the vehicle as a function of the magnitude of brake force applied.

2. The method according to claim 1, in which said vehicle has a power source for generating regenerative brake force which acts upon at least one wheel of said vehicle; and
    said method further comprises comparing energy consumption during said operation of said vehicle without demanding brake force from said at least one first brake system, with energy consumption during regenerative braking, and using said comparison as a basis for determining said measure of energy utilisation during said operation of said vehicle.

3. The method according to claim 2, in which said power source for generating said regenerative brake force which acts upon said at least one wheel of said vehicle comprises at least one electrical machine.

4. The method according to claim 2, wherein said comparing takes account of efficiency during regenerative braking.

5. The method according to claim 2, wherein said operation of said vehicle, without demand for brake force from said at least one first brake system is considered to represent better energy use during said operation of said vehicle than using regenerative braking to operate said vehicle in determining said measure of energy utilisation during said operation of said vehicle.

6. The method according to claim 2, wherein said vehicle is provided with at least one further brake system; and
    said method further comprises comparing energy consumption during operation of said vehicle, without demand for brake force from said at least one first brake system, with energy consumption during regenerative braking and with energy consumption by activation of said at least one further brake system, and using said comparison as a basis for determining said measure of energy utilisation during operation of said vehicle.

7. The method according to claim 6, wherein regenerative braking is deemed to represent better energy use than said activation of said at least one further brake system in determining said measure of energy utilisation during said operation of said vehicle.

8. The method according to claim 2, further comprising estimating energy consumption by regenerative braking, and determining a maximum recovery of energy for said regenerative braking as the maximum amount of energy recovered by said regenerative braking which can be stored in the regenerative brake system at full capacity of the regenerative brake system.

9. The method according to claim 1, further comprising displaying to said driver of said vehicle said measure of energy utilisation during said operation of said vehicle by displaying said measure of energy utilisation as a proportion of a measure which is found to correspond to a preferred way of operating said vehicle, said preferred way of operating said vehicle being operating said vehicle without demanding brake force from said at least one first brake system.

10. The method according to claim 1, in which said determination of said measure of energy utilisation takes place only when demand for motive force from said first power source is interrupted.

11. The method according to claim 1, in which said determination of said measure of energy utilisation takes the form of a measure for the whole of said first period of time.

12. The method according to claim 1, in which said measure of energy utilisation is determined and accumulated over a number of successive periods of time in which demand for motive force from said first power source is interrupted.

13. The method according to claim 1, further comprising presenting said measure of energy utilisation during operation of said vehicle for a vehicle's driver via a display.

14. The method according to claim 13, further comprising continuously displaying a representation of said measure during said first period of time based on changes in said measure.

15. The method according to claim 1, wherein said at least one first brake system is selected from one or more of the group of vehicle components consisting of: service brake system, retarder brake system, exhaust brake system, controllably regulatable engine brake system, compression brake system, electromagnetic brake system or other supplementary brake systems.

16. The method according to claim 1, wherein said at least one first brake system is independent of a combustion engine of said vehicle.

17. The method according to claim 16, wherein said at least one first brake system can be applied controllably irrespective of whether said combustion engine is disconnected from a downstream power train configured for driving said vehicle.

18. The method according to claim 1, wherein said demand of said brake force from said at least one first brake system is initiated by a driver of said vehicle.

19. The method according to claim 1, further comprising estimating energy consumption during said first period of time when said demand for said first motive force from said first power source is interrupted and when said first brake force is not applied;
estimating total energy consumption during said first period of time when said demand for said first motive force from said first power source is interrupted; and
determining said first measure of energy utilisation as a ratio between said energy consumption, when said demand for said first motive force from said first power source is interrupted and when said first brake force is not applied, and said total energy consumption.

20. The method according to claim 19, in which said total energy consumption during said first period of time comprises the energy consumed when said first brake force is not applied and the energy consumed when said first brake force is applied.

21. A computer program product comprising a non-volatile computer-readable medium and a computer program stored on said medium wherein said computer program comprises program code such that when said code is executed in a computer, said code causes said computer to apply a method for determining a measure of energy utilisation during operation of a vehicle, wherein said vehicle includes a first power source for generating a first motive force for propulsion of said vehicle in a first direction of travel, and at least one first brake system configured to be activated to apply a first brake force which acts against movement of said vehicle in said first direction of travel;
the method comprising performing the following steps, during a first period of time during said operation of said vehicle,
interrupting, by a driver of said vehicle, of a demand for said first motive force from said first power source, and during said interruption, performing the following steps:
estimating energy consumption during said operation of said vehicle without demanding brake force from said at least one first brake system,
determining said measure of energy utilisation during said operation of said vehicle based on said estimated energy consumption during said operation of said vehicle, without demanding said brake force from said at least one first brake system,
comparing, for said first period of time, said estimated energy consumption during said operation of said vehicle without demanding brake force from said at least one first brake system, said comparing being with energy consumption via active employment of one or more of said at least one first brake system, and using said comparison as a basis for determining said measure of energy utilisation during said operation of said vehicle, and
displaying to said driver of said vehicle said measure of energy utilisation during said operation of said vehicle by displaying said measure of energy utilisation as a bar with a reference line indicating maximum recovery of stored energy of the vehicle by regenerative braking for a corresponding value of brake force applied for the maximum recovery, a bar to the left or the right of the reference line indicating the amount of recovery or loss of the stored energy of the vehicle as a function of the magnitude of brake force applied.

22. A system for determining a measure of energy utilisation during operation of a vehicle, wherein said vehicle comprises:
a first power source for generating a first motive force for propulsion of said vehicle in a first direction of travel; and at least one first brake system which is configured and operable to be activated to apply a first brake force which acts against movement of said vehicle in said first direction of travel; and wherein
said system comprises:
means configured for estimating energy consumption during operation of said vehicle, without demanding brake force from said first brake system, and during a first period of time when demand for said first motive force from said first power source is interrupted by a driver of said vehicle;
means configured for comparing said estimated energy consumption during operation of said vehicle, without demanding brake force from said first brake system, and during said first period of time when demand for said first motive force from said first power source is interrupted by said driver of said vehicle, with energy consumption via active employment of one or more of said at least one first brake system, and using said comparison as a basis for determining a measure of energy utilisation during operation of said vehicle; and
means configured for displaying to said driver of said vehicle said measure of energy utilisation during said operation of said vehicle by displaying said measure of energy as a bar with a reference line indicating maximum recovery of stored energy of the vehicle by regenerative braking for a corresponding value of brake force applied for the maximum recovery, a bar to the left or the right of the reference line indicating the amount of recovery or loss of the stored energy of the vehicle as a function of the magnitude of brake force applied.

23. A system for determining a measure of energy utilisation during operation of a vehicle, and said vehicle, wherein said vehicle comprises:
a first power source for generating a first motive force for propulsion of said vehicle in a first direction of travel; and at least one first brake system which is configured and operable to be activated to apply a first brake force which acts against movement of said vehicle in said first direction of travel; and wherein said system comprises:
- means configured for estimating energy consumption during operation of said vehicle, without demanding brake force from said first brake system, and during a first period of time when demand for said first motive force from said first power source is interrupted by a driver of said vehicle;
- means configured for comparing said estimated energy consumption during operation of said vehicle, without demanding brake force from said first brake system, and during said first period of time when demand for said first motive force from said first power source is interrupted by said driver of said vehicle, with energy consumption via active employment of one or more of said at least one first brake system, and using said comparison as a basis for determining a measure of energy utilisation during operation of said vehicle; and
- means configured for displaying to said driver of said vehicle said measure of energy utilisation during said operation of said vehicle by displaying said measure of energy as a bar with a reference line indicating maximum recovery of stored energy of the vehicle by regenerative braking for a corresponding value of brake force applied for the maximum recovery, a bar to the left or the right of the reference line indicating the amount of recovery or loss of the stored energy of the vehicle as a function of the magnitude of brake force applied.

* * * * *